(12) United States Patent
Sunwoo et al.

(10) Patent No.: US 12,481,717 B2
(45) Date of Patent: Nov. 25, 2025

(54) CONVOLUTION METHOD FOR HIGH SPEED DEEP LEARNING

(71) Applicant: AJOU UNIVERSITY INDUSTRY-ACADEMIC COOPERATION FOUNDATION, Suwon-si (KR)

(72) Inventors: Myung Hoon Sunwoo, Seoul (KR); Tae Sun Kim, Anseong-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 1241 days.

(21) Appl. No.: 17/291,186

(22) PCT Filed: Aug. 21, 2019

(86) PCT No.: PCT/KR2019/010624
§ 371 (c)(1),
(2) Date: May 4, 2021

(87) PCT Pub. No.: WO2020/116745
PCT Pub. Date: Jun. 11, 2020

(65) Prior Publication Data
US 2022/0222316 A1 Jul. 14, 2022

(30) Foreign Application Priority Data
Dec. 7, 2018 (KR) ........................ 10-2018-0156777

(51) Int. Cl.
*G06F 17/15* (2006.01)
*G06N 3/08* (2023.01)

(52) U.S. Cl.
CPC ............. *G06F 17/153* (2013.01); *G06N 3/08* (2013.01)

(58) Field of Classification Search
None
See application file for complete search history.

(56) References Cited

U.S. PATENT DOCUMENTS 9,779,786 B1 10/2017 Wu et al.
2018/0181858 A1 6/2018 Son et al.

FOREIGN PATENT DOCUMENTS

KR 10-2018-0062422 A 6/2018
KR 10-2018-0109619 A 10/2018

OTHER PUBLICATIONS

Kim et al., A Novel Zero Weight/Activation-Aware Hardware Architecture of Convolutional Neural Network, 2017 Design, Automation and Test in Europe, IEEE 2017; pp. 1462-1467 (Year: 2017).*

(Continued)

*Primary Examiner* — Alan Chen
(74) *Attorney, Agent, or Firm* — Sughrue Mion, PLLC

(57) ABSTRACT

A convolution method for high speed deep learning according to the present invention includes (a) a step in which a feature map receiving unit of the convolution system receives a feature map configured by N channels; (b) a step in which a main controller of the convolution system selects a "0"-th channel from the feature map configured by N channels; (c) a step in which the main controller confirms a coordinate in which x, y coordinate is "0", from the feature map of the "0"-th channel; (d) a coarse step in which a convolution calculating unit of the convolution system performs a convolution operation and a rectified linear unit (ReLU) operation while shifting by 2 in a horizontal direction and a vertical direction in the feature map; (e) a step in which the channel switching unit of the convolution system switches the channel to a subsequent channel when the coarse step is completed for the feature map of the "0"-th channel; (g) a step in which the main controller determines (Continued)

whether the switched channel is greater or less than N; and (g) a step in which if the channel switched in step (0 is greater than N, the main controller determines that the convolution operation for all channels has been completed and outputs the feature map by means of a feature map output unit. By doing this, the convolution operation which occupies most of the convolution neural network is reduced to increase inference speed in the deep learning.

9 Claims, 5 Drawing Sheets

(56) References Cited

OTHER PUBLICATIONS

Keiron O'shea, et al., "An Introduction to Convolutional Neural Networks", arXiv.org>cs>arXiv:1511.08458v2., Cornell University, Dec. 2, 2015, [Retrieved on Nov. 26, 2019], Retrieved from <https://arxiv.org/abs/1511.08458>, pp. 1-12.
Xingyu Liu, et al., "Efficient Sparse-Winograd Convolutional Neural Networks", arXiv.org>cs>arXiv:1802.06367v1, Feb. 18, 2018, [Retrieved on Nov. 26, 2019], Retrieved from <https://arxiv.org/abs/1802.06367>, Cornell University, pp. 1-11.
International Search Report for PCT/KR2019/010624 dated Dec. 12, 2019 PCT/ISA/210.
Written Opinion for PCT/KR2019/010624 dated Dec. 12, 2019 PCT/ISA/237.
Korean Office Action for 10-2018-015677 dated Aug. 27, 2019.
Korean Office Action for 10-2018-015677 dated Dec. 6, 2019.
Beom Eom, CNN, Convolutional Neural Network, (Internet website), Mar. 27, 2017, [Retrieved on Nov. 26, 2019], Retrieved from https://umbum.tistory.com/223, see pp. 1-12.

* cited by examiner

CONVOLUTION METHOD FOR HIGH SPEED DEEP LEARNING

CROSS REFERENCE TO RELATED APPLICATIONS

This application is a National Stage of International Application No. PCT/KR2019/010624 filed Aug. 21, 2019, claiming priority based on Korean Patent Application No. 10-2018-0156777 filed Dec. 7, 2018.

TECHNICAL FIELD

The present invention relates to a convolution method for high speed deep learning, and more particularly, to a convolution method for high speed deep learning which may increase an inference speed in deep learning by reducing a convolution operation in a convolutional neural network by performing a convolution operation and a rectified linear unit (ReLU) operation such that a difference between operation points is 2 in a coarse step.

BACKGROUND ART

The convolution operation is a multiplication and accumulation (MAC) operation which multiplies each weight of a filter and a pixel while sliding the weight from the image and accumulates the multiplied values so that a computational amount is large. The convolution operation of the convolutional neural network for image processing occupies most of the neural network operation. The larger the image and the deeper the depth of the neural network, the larger the computational amount. Therefore, the power consumption is increased so that there is a problem which makes it difficult to process images in real time and efficiently manage the power in the system.

DISCLOSURE

Technical Problem

An object of the present invention is to provide a convolution method for high speed deep learning which increases an inference speed in the deep learning by reducing the convolution operation in the convolutional neural network by performing a convolution operation and a rectified linear unit (ReLU) operation such that a difference between operation points is 2 in a coarse step.

Technical Solution

In order to achieve the above-described object, a convolution method for high speed deep learning according to the present invention includes (a) a step in which a feature map receiving unit of the convolution system receives a feature map configured by N channels; (b) a step in which a main controller of the convolution system selects a "0"-th channel from the feature map configured by N channels; (c) a step in which the main controller confirms a coordinate in which x, y coordinate is "0", from the feature map of the "0"-th channel; (d) a coarse step in which a convolution calculating unit of the convolution system performs a convolution operation and a rectified linear unit (ReLU) operation while proceeding by 2 in a horizontal direction and a vertical direction in the feature map; (e) a fine step in which the main controller fills the x,y coordinate which has been emptied by one space due to the shifting by 2 in the coarse step; (f) a step in which the channel switching unit of the convolution system switches the channel to a subsequent channel when the fine step is completed; (g) a step in which the main controller determines whether the switched channel is greater or less than N; and (h) a step in which if the channel switched in step (g) is greater than N, the main controller determines that the convolution operation for all channels has been completed and outputs the feature map by means of a feature map output unit.

Further, in order to achieve the above-described object, in the convolution method for high speed deep learning according to the present invention, the step (d) includes: (d-1) a step in which the convolution calculating unit performs a convolution operation and a rectified linear unit (ReLU) operation at an arbitrary point (x, y) of the feature map; (d-2) a step in which the convolution calculating unit determines whether the calculated convolution operation value at the arbitrary point (x, y) is greater than "0"; (d-3) a step in which if the convolution operation value at the arbitrary point (x, y) by the main controller is greater than "0", the convolution calculating unit 130 calculates points adjacent to the calculated point; (d-4) a step in which if the convolution operation value at the arbitrary point (x, y) is not greater than "0", the main controller shifts the calculation point of the x coordinate to a point in which the difference from the previous calculation point is 2; (d-5) a step in which the main controller compares the sizes of the x coordinate of the shifted calculation point and a width W of the feature map; (d-6) a step in which if the x coordinate value at a point shifted by 2 from the previous calculation point is greater than the width W, the main controller shifts the y coordinate by 2, that is, shifts a column down by 2; and (d-7) a step in which the main controller compares the sizes of the y coordinate of the shifted calculation point and a height H of the feature map.

Further, in order to achieve the above-described object, in the convolution method for high speed deep learning according to the present invention, in the step (d-5), after the comparing step, if the x coordinate value is smaller than the width W, the main controller repeatedly performs steps after the (d-1) step of performing a convolution operation at the x coordinate point (x, y) which has been shifted by 2.

Further, in order to achieve the above-described object, in the convolution method for high speed deep learning according to the present invention, in the step (d-7), after the comparing step, if the y coordinate value is smaller than the height H, the main controller repeatedly performs steps after the (d-1) step of performing a convolution operation at the x coordinate point (x, y) which has been shifted by 2.

Further, in order to achieve the above-described object, in the convolution method for high speed deep learning according to the present invention, in the step (d-7), if the y coordinate value at the point shifted by 2 from the previous calculation point is greater than the height H, the main controller performs a fine step.

Further, in order to achieve the above-described object, in the convolution method for high speed deep learning according to the present invention, the step (e) includes: (e-1) a step in which the main controller determines whether an x, y output coordinate of the feature map is 1; (e-2) a step in which if the x, y output coordinate is 1, the main controller calculates convolution between adjacent points; (e-3) a step in which if the x, y output coordinate is not 1, the main controller shifts by 1 from the calculation point; (e-4) a step in which the main controller compares the sizes of the x coordinate shifted by 1 and a width W of the feature map; and (e-5) a step in which if the x coordinate is less than the width W, the main controller repeatedly performs the step (e-1) and if the x coordinate is greater than the width W, shifts they coordinate by 1.

Further, in order to achieve the above-described object, in the convolution method for high speed deep learning according to the present invention, after the step (e-5), when the y coordinate value at a point shifted by 1 is greater than the height H, the step (f) in which the channel shifting unit shifts the channel is performed.

Further, in order to achieve the above-described object, the convolution method for high speed deep learning according to the present invention further includes: after the step (f), (g') a step in which if the shifted channel is less than the N-th accumulated channel, the main controller repeatedly performs steps after the step (c) in which the main controller confirms a coordinate in which x, y coordinate is "0", from the feature map of the shifted channel.

Further, in order to achieve the above-described object, in the convolution method for high speed deep learning according to the present invention, in the step (d), the convolution calculating unit performs a convolution operation and rectified linear unit (ReLU) operation with $$Conv(out\_i\ dx, x, y) = ReLU$$

$$\left(\left(\sum_{i=0}^{N\_in}\sum_{n=0}^{2}\sum_{m=0}^{2} f_{in}(in\_i\ dx, x-1+n, y-1+m) \times w(n, m)\right) + bias(out\_i\ dx)\right)$$

in which in_idx is an input feature map of i-th channel, x, y is an x, y coordinate of the feature map, and n, m is an x, y coordinate of a weight filter which applies a weight.

Advantageous Effects

According to the convolution method for high speed deep learning according to the present invention, the convolution operation which occupies the most of the convolutional neural network is reduced so that the inference speed in the deep learning may be increased and the power consumption may be reduced.

BEST MODE

Figure 1:
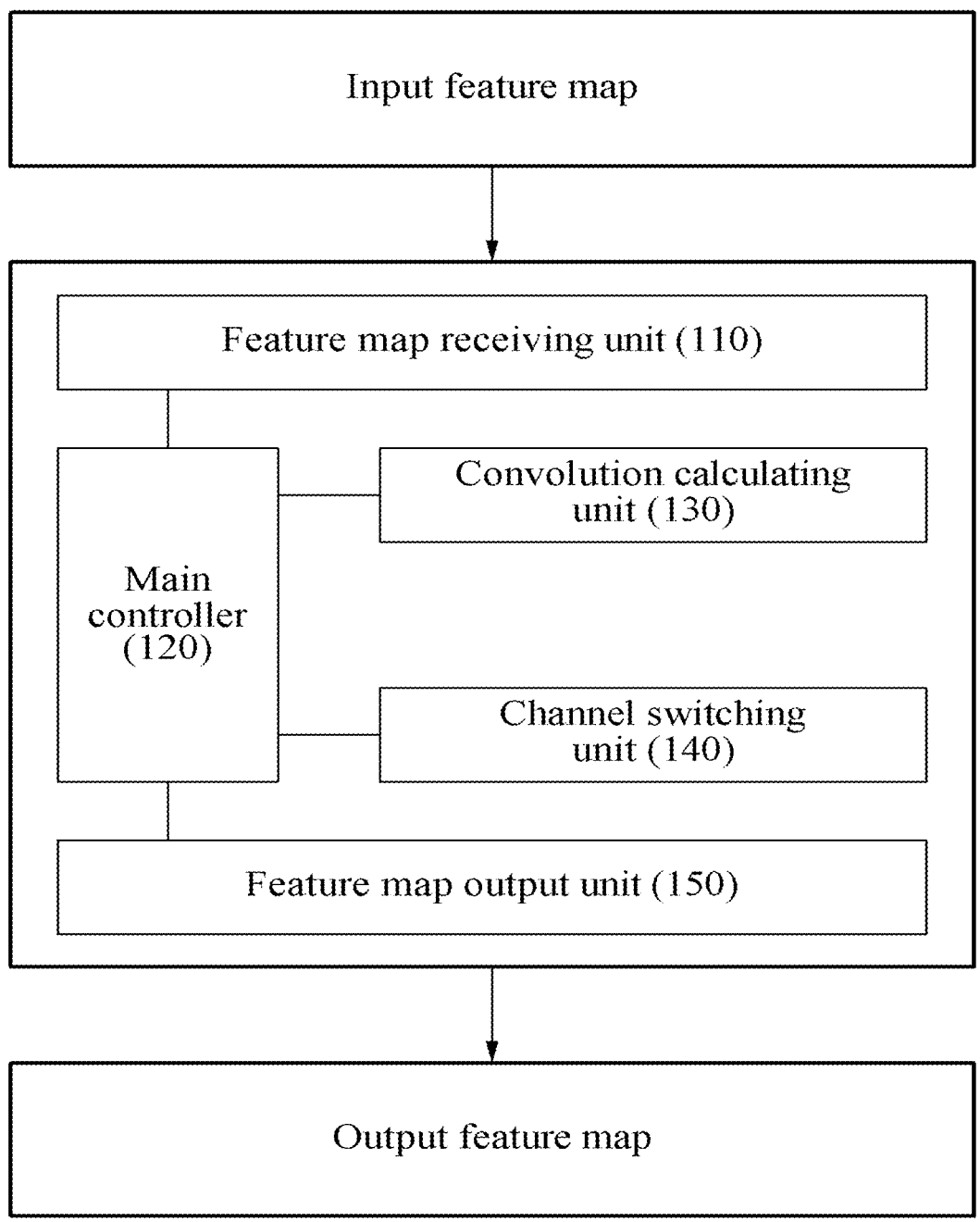
FIG. 1 is a block diagram of a convolution system for high speed deep learning according to the present invention.

Those skilled in the art may make various modifications to the present invention and the present invention may have various embodiments thereof, and thus specific embodiments will be described in detail with reference to the drawings. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

In the specification and the claim, unless explicitly described to the contrary, the word "comprise" and variations such as "comprises" or "comprising", will be understood to imply the inclusion of stated elements but not the exclusion of any other elements.

Hereinafter, exemplary embodiments according to the present invention will be described in detail with reference to accompanying drawings.

FIG. 1 is a block diagram of a convolution system for high speed deep learning according to the present invention.

As illustrated in FIG. 1, a convolution system for high speed deep learning according to the present invention includes a feature map receiving unit 110, a main controller 120, a convolution calculating unit 130, a channel switching unit 140, and a feature map output unit 150.

Figure 2:
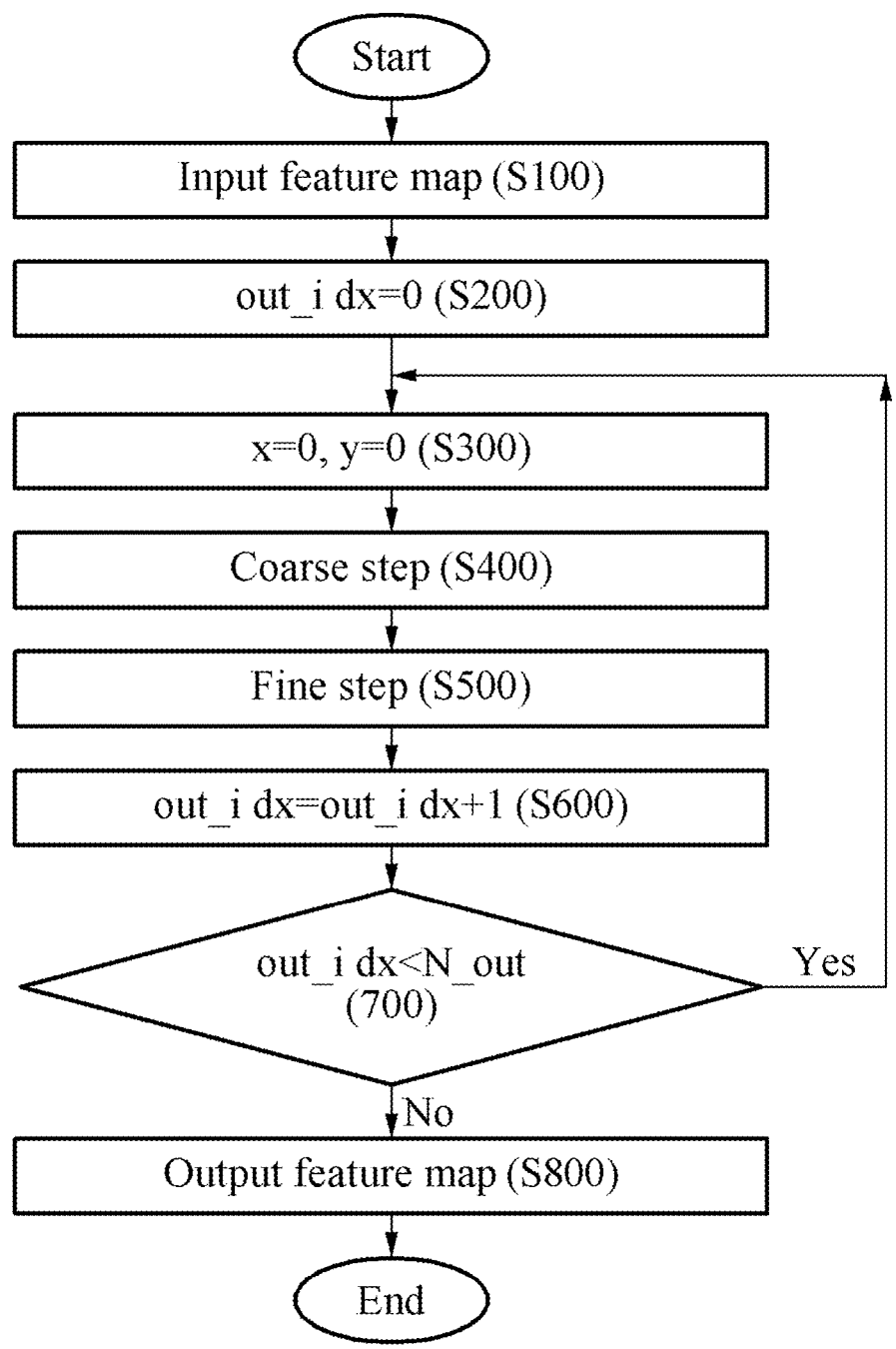
FIG. 2 is a flowchart of a convolution method for high speed deep learning according to the present invention.

FIG. 2 is a flowchart of a convolution method for high speed deep learning according to the present invention.

As illustrated in FIG. 2, the feature map receiving unit 110 of the convolution system for high speed deep learning according to the present invention performs a step of receiving a feature map (S100).

For reference, the feature map is a result obtained by applying a convolution kernel to an image or a video frame configured by a plurality of pixels to extract a feature value and is configured by a matrix including a plurality of convolution values.

Figure 5:
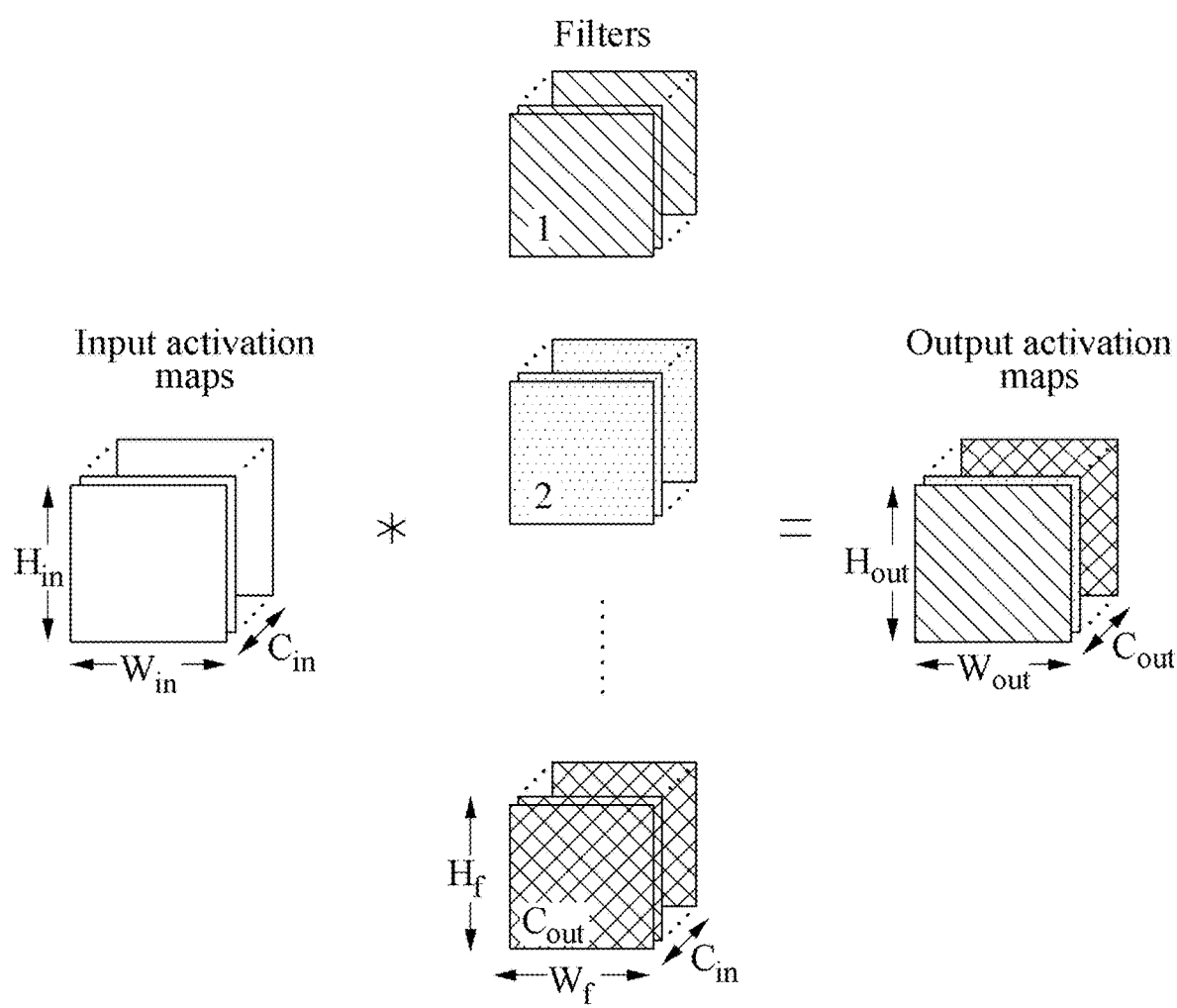
FIG. 5 is a view illustrating a feature map structure used for convolution for high speed deep learning according to the present invention.

Specifically, in the present invention, the feature map is assumed to be configured by N channels which have a width W in a horizontal direction and a height H in a vertical direction and are accumulated as layers as illustrated in FIG. 5.

The main controller 120 performs a step of selecting a "0"-th channel from the feature map configured by a plurality of channels which is received by the feature map receiving unit 110 (S120).

Thereafter, the main controller 120 performs a step of confirming an x, y coordinate which is "0", in the feature map of the selected channel (S300).

The convolution calculating unit 130 performs a coarse step which performs a convolution operation and a rectified linear unit (ReLU) operation while shifting by 2 in a horizontal direction and a vertical direction as represented in the following Table 1 starting from the coordinate (x=0 and y=0) confirmed by the main controller 120 (S400).

TABLE 1

| 92.3 | 56.8 | 33.3 | 13.9 |
|------|------|------|------|
| 0    | 0    | 0    | 12.0 |

Specifically, the calculation by the convolution calculating unit 130 in step S400 is performed according to the following Equation 1.

$$Conv(out\_i\ dx, x, y) = ReLU$$

$$\left( \left( \sum_{i=0}^{N\_in} \sum_{n=0}^{2} \sum_{m=0}^{2} f_{in}(in\_i\ dx, x-1+n, y-1+m) \times w(n, m) \right) + bias(out\_i\ dx) \right)$$

[Equation 1]

In Equation 1, in_idx is an input feature map of an i-th channel, x and y are x and y coordinates of the feature map, and n and m are x and y coordinates of a weight filter which applies a weight.

Figure 3:
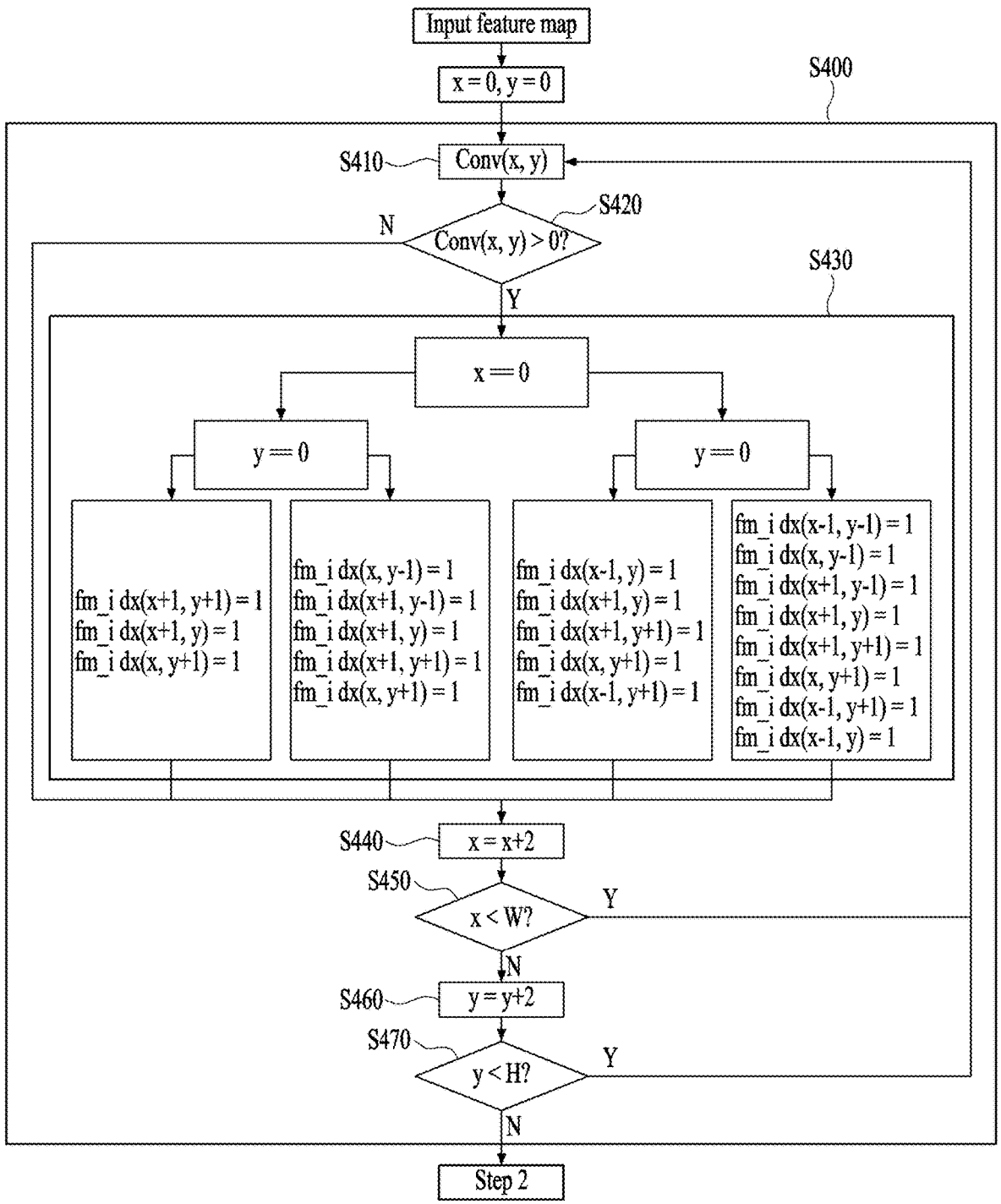
FIG. 3 is a flowchart of a coarse step of a convolution method for high speed deep learning according to the present invention.

Hereinafter, the coarse step will be described in more detail with reference to FIG. 3.

The convolution calculating unit 130 performs a step of performing a convolution operation at an arbitrary point (x, y) of the feature map (S410).

The main controller 120 performs a step of determining whether a convolution operation value at the arbitrary point (x, y) calculated by the convolution calculating unit 130 is greater than "0" (S420).

When the convolution operation value at the arbitrary point (x, y) is greater than "0" as a result of the determination by the main controller 120, the convolution calculating unit 130 performs a step of calculating points adjacent to the calculation point (S430).

TABLE 2

| 92.3 | 75.3 | 56.8 | 42.3 | 33.3 | 22.4 | 13.9 | 8.6  |
|------|------|------|------|------|------|------|------|
| 64.2 | 61.9 | 61.3 | 64.1 | 62.5 | 49.7 | 32.7 | 26.0 |
| 0    | 0    | 0    | 0    | 0    | 6.4  | 12.0 | 21.0 |
| 0    | 0    | 0    | 0    | 0    | 0    | 0    | 0    |

<Part of VGG16 NET Feature Map>

Generally, most neighboring pixels in a natural image belong to the same object so that there is a high probability of having similar values. Further, adjacent pixels have similar values so that the convolution calculating values of two arbitrary points are similar.

Table 2 represents a part of the feature map of VGG16. As seen from Table 2, it is understood that values of the adjacent pixels show a similar tendency (a tendency to decrease).

Accordingly, when the convolution value at an arbitrary point is "0" or greater, there is a high probability that the convolution operation value at adjacent points is also "0" or greater.

In the meantime, when the convolution operation value at the arbitrary point (x, y) is not greater than "0" as a result of determination by the main controller 120 in step S420, the main controller 120 performs a step of shifting a calculation point of the x coordinate to a point at which a difference from the previous calculation point is 2 (S440).

The main controller 120 performs a step of comparing the sizes of the x coordinate of the shifted calculation point and a width W of the feature map (S450).

When the x coordinate value at the point which is shifted by 2 from the previous calculation point is smaller than the width W, the main controller 120 repeatedly performs steps after the step S410 of performing a convolution operation at an x coordinate point (x, y) of a point shifted by 2.

When the x coordinate value at a point shifted by 2 from the previous calculation point is greater than the width W, the main controller 120 performs a step of shifting the y coordinate by 2, that is, shifting the column down by 2 (S460).

The main controller 120 performs a step of comparing the sizes of the y coordinate and a height H of the feature map (S470).

When the y coordinate value of the point which is shifted by 2 from the previous calculation point is smaller than the height H, the main controller 120 repeatedly performs steps after the step S410 of performing a convolution operation at an x coordinate point (x, y) of a point shifted by 2.

When the y coordinate value at the point shifted by 2 from the previous calculation point is greater than the height H, the main controller 120 performs a fine step (S500).

Figure 4:
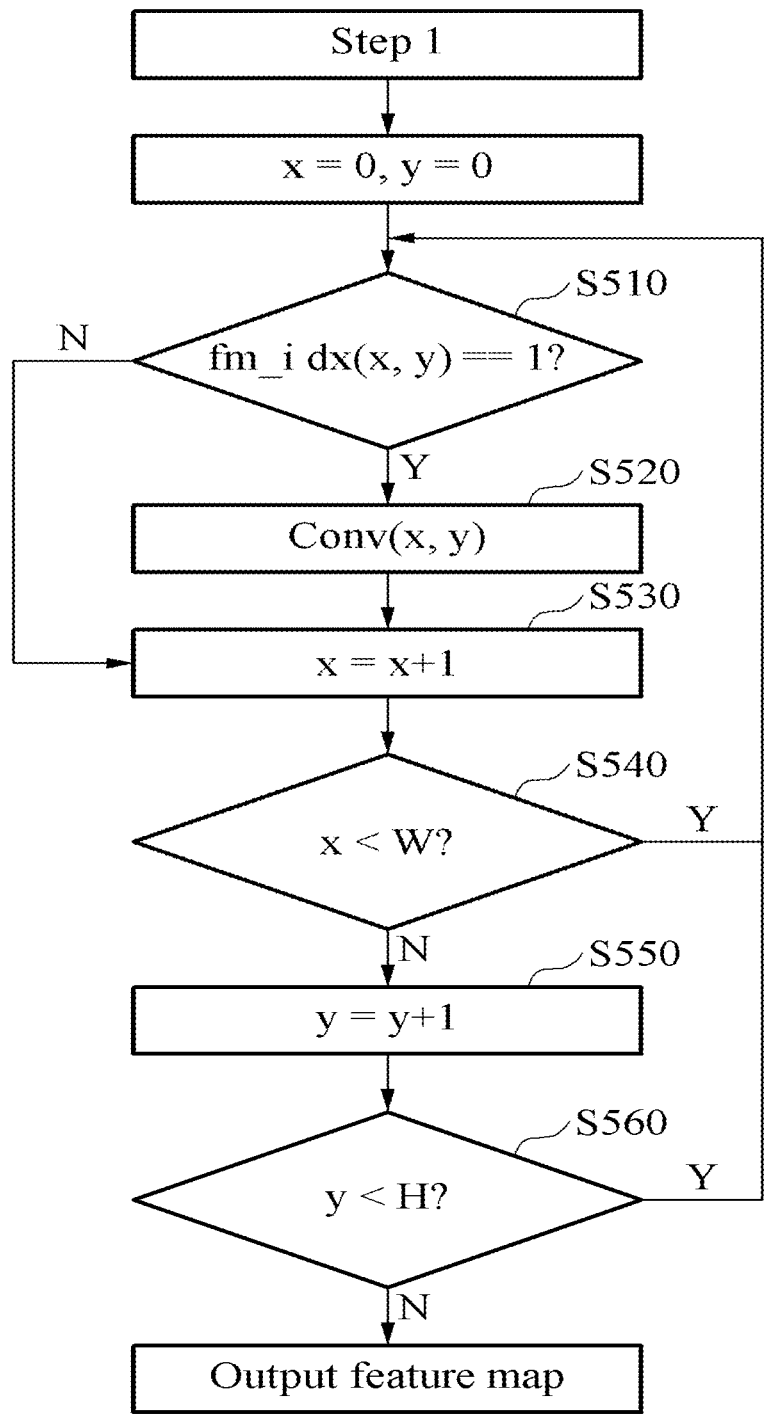
FIG. 4 is a flowchart of a fine step of a convolution method for high speed deep learning according to the present invention.

The fine step (S500) is a step of filling the x, y coordinate which has been emptied by one space due to the shifting by 2 in the coarse step and will be described in detail with reference to the flowchart of the fine step (S500) illustrated in FIG. 4.

The main controller 120 performs a step of determining whether an x, y output coordinate of the feature map is 1 (S510) and if the x, y output coordinate is 1, performs a step of calculating convolution between adjacent points (S520) and if the x, y output coordinate is not 1, performs a step of shifting by 1 from the calculation point (S530).

The main controller 120 performs a step of comparing the sizes of the x coordinate shifted by 1 and the width W of the feature map (S540) and if the x coordinate is smaller than the width W, repeatedly performs the step S510 and if the x coordinate is greater than the width W, performs a step of shifting the y coordinate by 1, that is, shifting the y coordinate down by 1 (S550).

When the y coordinate value at the point shifted by 1 from the previous calculation point is greater than the height H, the channel switching unit 140 performs a step of switching a channel (S600).

The main controller 120 performs a step of determining whether the switched channel is greater or lower than an N-th channel accumulated as layers (S700).

If the switched channel is smaller than the N-th accumulated channel as a result of the determination in step S700, the main controller 120 repeatedly performs steps after the step S300 of confirming a coordinate in which the x, y coordinate is "0" in a feature map of the switched channel.

When the switched channel is greater than the N-th accumulated channel as a result of determination in step S700, the main controller 120 completes a convolution operation for all channels and performs a step of outputting a feature map by means of the feature map output unit 150 (S800).

In order to measure a performance of the convolution system algorithm for high speed deep learning according to the present invention, it was applied to a VGG16 network. VGG16 has a simple network structure and includes many convolution operations so that it is appropriate to show a performance of a proposed algorithm.

Further, for the ease of convolution layer implementation, the proposed algorithm was implemented by C++ and a parameter pre-trained with ILSVRC-2012 was used. For the comparison of the performances, 1000 images were arbitrarily selected from images included in ILSVRC-2012 to be simulated.

The result is represented in the following tables.

TABLE 3

| | MAC/image (million) | | |
|---|---|---|---|
| | | Method according to present invention | |
| | VGG16 | Algorithm of present invention | Reduced amount |
| Conv1_1 | 86.7 | 63.7 | 26.5 |
| Conv1_2 | 1849.7 | 1557.1 | 15.8 |
| Conv2_1 | 924.8 | 779.6 | 15.7 |
| Conv2_2 | 1849.7 | 1471.1 | 20.5 |
| Conv3_1 | 924.8 | 720.4 | 22.1 |
| Conv3_2 | 1849.7 | 1441.6 | 22.1 |
| Conv3_3 | 1849.7 | 1094.3 | 40.8 |
| Conv4_1 | 924.8 | 605.8 | 34.5 |
| Conv4_2 | 1849.7 | 1065.1 | 42.4 |
| Conv4_3 | 1849.7 | 714.0 | 61.4 |
| Conv5_1 | 462.4 | 245.6 | 46.9 |
| Conv5_2 | 462.4 | 209.9 | 54.6 |
| Conv5_3 | 462.4 | 145.0 | 68.6 |
| total | 15346.6 | 10113.4 | 34.1 |

<Comparison of MAC of VGG16 and Algorithm of Convolution Method According to Present Invention>

In Table 3, the MAC computational amounts were compared for each convolution layer of the original VGG16[1] and the VGG16 to which an algorithm used for a system according to the present invention was applied.

The higher the convolution layers, the larger the reduced MAC computational amount. By doing this, it is confirmed that the algorithm used for the system according to the present invention acts on a higher level of convolution layer with a smaller feature map better than on a lower level of convolution layers with a larger feature map.

TABLE 4

| | | VGG16 | Method according to present invention Algorithm of present invention | |
|---|---|---|---|---|
| Accuracy | Top 1 | 643 | 618 | (−2.5%) |
| | Top 5 | 864 | 855 | (−34.1%) |
| MAC/image(million) in convolution layer | | 15346 | 10113 | (−34.1%) |

<Comparison of Algorithm of Convolution Method According to Present Invention and VGG16>

In Table 4, a VGG16 to which the algorithm of the convolution method according to the present invention is applied and a VGG16 to which the algorithm is not applied are compared.

As compared with the existing VGG16[1], according to the algorithm of the convolution method according to the present invention, the precisions of top 1 and top 5 are lowered by 2.5% and 0.9%, respectively, but the number of MAC in the convolution layer for every image is reduced by approximately 34.1%. The algorithm of the convolution method according to the present invention may use the existing parameter as it is without training the parameter again. Accordingly, the algorithm of the convolution method according to the present invention may also be applied to most of the other CNN.

It will be appreciated that various exemplary embodiments of the present invention have been described herein for purposes of illustration, and that various modifications, changes, and substitutions may be made by those skilled in the art without departing from the scope and spirit of the present invention. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

The invention claimed is:

1. A convolution method for deep learning by a convolution system, the convolution method comprising:
 (a) a step in which a feature map receiving unit of the convolution system receives a feature map configured by N channels;
 (b) a step in which a main controller of the convolution system selects a "0"-th channel from the feature map configured by N channels;
 (c) a step in which the main controller confirms a coordinate in which x, y coordinate is "0", from the feature map of the "0"-th channel;
 (d) a coarse step in which a convolution calculating unit of the convolution system performs a convolution operation and a rectified linear unit (ReLU) operation while shifting a calculation point by 2 pixels in a horizontal direction and a vertical direction in the feature map;
 (e) a fine step in which the main controller fills the x,y coordinate which has been emptied by a space corresponding to a pixel due to the shifting of the calculation point by 2 pixels in the coarse step;
 (f) a step in which a channel switching unit of the convolution system switches the channel to a subsequent channel when the fine step is completed;
 (g) a step in which the main controller determines whether the switched channel is greater or less than N; and
 (h) a step in which if the channel switched in step (g) is greater than N, the main controller determines that the convolution operation for all channels has been completed and outputs the feature map by means of a feature map output unit of the convolution system.

2. The convolution method for deep learning according to claim 1, wherein the step (d) includes:
- (d-1) a step in which the convolution calculating unit performs a convolution operation and rectified linear unit (ReLU) operation at an arbitrary point (x, y) of the feature map;
- (d-2) a step in which the convolution calculating unit determines whether the calculated convolution operation value at the arbitrary point (x, y) is greater than "0";
- (d-3) a step in which if the convolution operation value at the arbitrary point (x, y) by the main controller is greater than "0", the convolution calculating unit-130 calculates points adjacent to the calculation point;
- (d-4) a step in which if the convolution operation value at the arbitrary point (x, y) is not greater than "0", the main controller shifts the calculation point of the x coordinate to a point at which the difference from the previous calculation point is 2;
- (d-5) a step in which the main controller compares the sizes of the x coordinate of the shifted calculation point and a width W of the feature map;
- (d-6) a step in which if the x coordinate value at a point shifted by 2 from the previous calculation point is greater than the width W, the main controller shifts the y coordinate by 2, that is, shifts a column down by 2; and
- (d-7) a step in which the main controller compares the sizes of the y coordinate of the shifted calculation point and a height H of the feature map.

3. The convolution method for deep learning according to claim 2, wherein in the step (d-5), after the comparing step, if the x coordinate value is less than the width W, the main controller repeatedly performs steps after the (d-1) step of performing a convolution operation at the x coordinate point (x, y) which has been shifted by 2.

4. The convolution method for deep learning according to claim 2, wherein in the step (d-7), after the comparing step, if the y coordinate value is less than the height H, the main controller repeatedly performs steps after the (d-1) step of performing a convolution operation at the x coordinate point (x, y) which has been shifted by 2.

5. The convolution method for deep learning according to claim 2, wherein in the step (d-7), when the y coordinate value at the point shifted by 2 from the previous calculation point is greater than the height H, the main controller performs a fine step.

6. The convolution method for deep learning according to claim 1, wherein the step (e) includes:
- (e-1) a step in which the main controller determines whether an x, y output coordinate of the feature map is 1;
- (e-2) a step in which if the x, y output coordinate is 1, the main controller calculates convolution between adjacent points;
- (e-3) a step in which if the x, y output coordinate is not 1, the main controller shifts by 1 from the calculation point;
- (e-4) a step in which the main controller compares the sizes of the x coordinate shifted by 1 and a width W of the feature map; and
- (e-5) a step in which if the x coordinate is less than the width W, the main controller repeatedly performs the step (e-1) and if the x coordinate is greater than the width W, shifts the y coordinate by 1.

7. The convolution method for deep learning according to claim 6, wherein after the step (e-5), if the y coordinate value at a point shifted by 1 is greater than the height H, the step (f) in which a channel shifting unit of the convolution system shifts the channel is performed.

8. The convolution method for deep learning according to claim 1, further comprising:
after the step (f),
- (g') a step in which if the shifted channel is less than the N-th accumulated channel, the main controller repeatedly performs steps after the step (c) in which the main controller confirms a coordinate in which x, y coordinate is "0", from the feature map of the shifted channel.

9. The convolution method for deep learning according to claim 1, wherein in the step (d), the convolution calculating unit performs a convolution operation and a rectified linear unit (ReLU) operation with $Conv(\text{out\_i } dx, x, y) = ReLU$ $$\left(\left(\sum_{i=0}^{N\_in} \sum_{n=0}^{2} \sum_{m=0}^{2} f_{in}(\text{in\_i } dx, x-1+n, y-1+m) \times w(n,m)\right) + \text{bias}(\text{out\_i } dx)\right)$$

in which in_idx is an input feature map of i-th channel, x, y is an x, y coordinate of the feature map, and n, m is an x, y coordinate of a weight filter which applies a weight.

* * * * *